(12) United States Patent
Ouchi

(10) Patent No.: US 9,092,879 B2
(45) Date of Patent: Jul. 28, 2015

(54) IMAGE DISPLAY APPARATUS AND IMAGE DISPLAY METHOD

(71) Applicant: CANON KABUSHIKI KAISHA, Tokyo (JP)

(72) Inventor: Akihiro Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/023,495

(22) Filed: Sep. 11, 2013

(65) Prior Publication Data

US 2014/0049565 A1 Feb. 20, 2014

Related U.S. Application Data

(63) Continuation of application No. 13/600,394, filed on Aug. 31, 2012, now Pat. No. 8,547,398, which is a continuation of application No. 12/169,570, filed on Jul. 8, 2008, now Pat. No. 8,259,133.

(30) Foreign Application Priority Data

Jul. 10, 2007 (JP) .................................. 2007-181326

(51) Int. Cl.
*G09G 5/00* (2006.01)
*G06T 3/40* (2006.01)
*G09G 5/14* (2006.01)

(52) U.S. Cl.
CPC .. *G06T 3/40* (2013.01); *G09G 5/00* (2013.01); *G09G 5/14* (2013.01); *G09G 2310/06* (2013.01); *G09G 2340/0414* (2013.01); *G09G 2340/0421* (2013.01); *G09G 2340/0471* (2013.01); *G09G 2340/0478* (2013.01); *G09G 2360/18* (2013.01)

(58) Field of Classification Search
CPC ......... G09G 1/16; G09G 5/227; G09G 5/391; G09G 5/00; G09G 5/14; G09G 2310/06; G09G 2340/0414; G09G 2340/0407; G09G 2340/0421; G09G 2340/0471; G09G 2340/0478; G09G 2360/18
See application file for complete search history.

(56) References Cited

U.S. PATENT DOCUMENTS

| | | | | |
|---|---|---|---|---|
| 6,081,277 | A * | 6/2000 | Kojima | 345/661 |
| 2004/0066393 | A1 * | 4/2004 | Cragun | 345/660 |
| 2004/0263426 | A1 | 12/2004 | Endo | |
| 2006/0152588 | A1 * | 7/2006 | Iida et al. | 348/207.99 |
| 2007/0234229 | A1 | 10/2007 | Ohtsuka et al. | |
| 2009/0207195 | A1 | 8/2009 | Chin et al. | |

FOREIGN PATENT DOCUMENTS

JP 6-30335 A 2/1994

* cited by examiner

*Primary Examiner* — Jwalant Amin
(74) *Attorney, Agent, or Firm* — Carter, DeLuca, Farrell & Schmidt, LLP

(57) ABSTRACT

An image display apparatus according to an embodiment of the present invention includes: a moving unit configured to move a display position of an image displayed on a display screen; a setting unit configured to set a compressed image display area in the image; and a compression unit configured to, when a nondisplay area that is not displayed on the display screen is created in the image by the moving unit, compress the nondisplay area so that the nondisplay area fits within the compressed image display area and is displayed on the display screen.

8 Claims, 20 Drawing Sheets

IMAGE DISPLAY APPARATUS AND IMAGE DISPLAY METHOD

CROSS REFERENCE TO RELATED APPLICATIONS

This application is a continuation of Ser. No. 13/600,394 filed Aug. 31, 2012, which is a continuation of U.S. Pat. No. 8,259,133 filed Jul. 8, 2008, which claims the benefit of and priority to Japanese Application No. 2007-181326 filed Jul. 10, 2007, the contents of each of which are hereby incorporated by reference herein in their entirety.

BACKGROUND OF THE INVENTION

1. Field of the Invention

The present invention relates to an image display apparatus and an image display method, and, more particularly, to a technique for displaying a moved image.

2. Description of the Related Art

In recent years, there have been increased opportunities for displaying data for third parties using a large screen display in a meeting or presentation. For example, various types of data such as textual data, table data, and graphical data, which are created using application software for a personal computer, are displayed for third parties using a large screen display such as a front projector or a rear projector. In such a case, a multi-screen display function of displaying a plurality of images, which are sent from different personal computers or from a personal computer and a video apparatus, at the same time can be effectively used.

The multi-screen display function is used in television sets. As illustrated in FIG. 11, using the multi-screen display function, a first screen 110 of full screen size and a second screen 120 of reduced size which is reduced so that the second screen 120 fits within a predetermined area can be displayed. However, in the case of a general multi-screen display function, as illustrated in FIG. 11, since the second screen 120 is displayed in front of the first screen 110, a portion of the first screen 110 under the display area of the second screen 120 is hidden and invisible.

In order to improve a visual effect by arranging important image portions of a plurality of displayed screens, it is desirable that the display areas of the first screen 110 and the second screen 120 be freely movable. For example, Japanese Patent Laid-Open No. 6-30335 discloses a display method of moving a first screen so as not to overlap with a second screen.

In the method disclosed in Japanese Patent Laid-Open No. 6-30335, a time of Lm is added to a data writing time at which data is written into a memory so as to determine a data reading time at which the data is read out from the memory as illustrated in FIG. 12, so that a displayed image is shifted to the left as illustrated in FIG. 13. On the other hand, by subtracting the time of Lm from the data writing time so as to determine the data reading time, the displayed image can be shifted to the right as illustrated in FIG. 14.

However, since the image displayed after a display position has been moved extends off a screen area, a part of the image becomes invisible. Accordingly, it is difficult to see the entire area of the image. In order to see the entire area of the image, a method of compressing the image so as to fit the entire area of the image within a limited display area that has been changed in accordance with the movement of the display position can be considered. However, in this case, the aspect ratio of the image is changed, or a part of the image the detailed view of which is required is also reduced in size. This makes it difficult to see displayed information.

SUMMARY OF THE INVENTION

The present invention provides an image display apparatus and an image display method which are capable of displaying all the information contained within an image without making it difficult to see the information.

An image display apparatus according to an embodiment of the present invention includes: a moving unit configured to move a display position of an image displayed on a display screen; a setting unit configured to set a compressed image display area in the image; and a compression unit configured to, when a nondisplay area that is not displayed on the display screen is created in the image by the moving unit, compress the nondisplay area so that the nondisplay area fits within the compressed image display area and is displayed on the display screen.

An image display control method according to an embodiment of the present invention is a method of controlling an image display apparatus. The image display control method includes: moving a display position of an image displayed on a display screen of the image display apparatus; setting a compressed image display area in the image; and compressing, when a nondisplay area that is not displayed on the display screen is created in the image, the nondisplay area so that the nondisplay area fits within the compressed image display area and is displayed on the display screen.

According to an embodiment of the present invention, a part of an image which extends off a compressed image display area is compressed so that the part fits within the compressed image display area and is displayed on a display screen. Accordingly, all the information contained within the image can be displayed without making it difficult to see the information. As a result, display flexibility can be improved.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Various embodiments of the present invention will be described below with reference to the accompanying drawings.

First Embodiment

Figure 1:
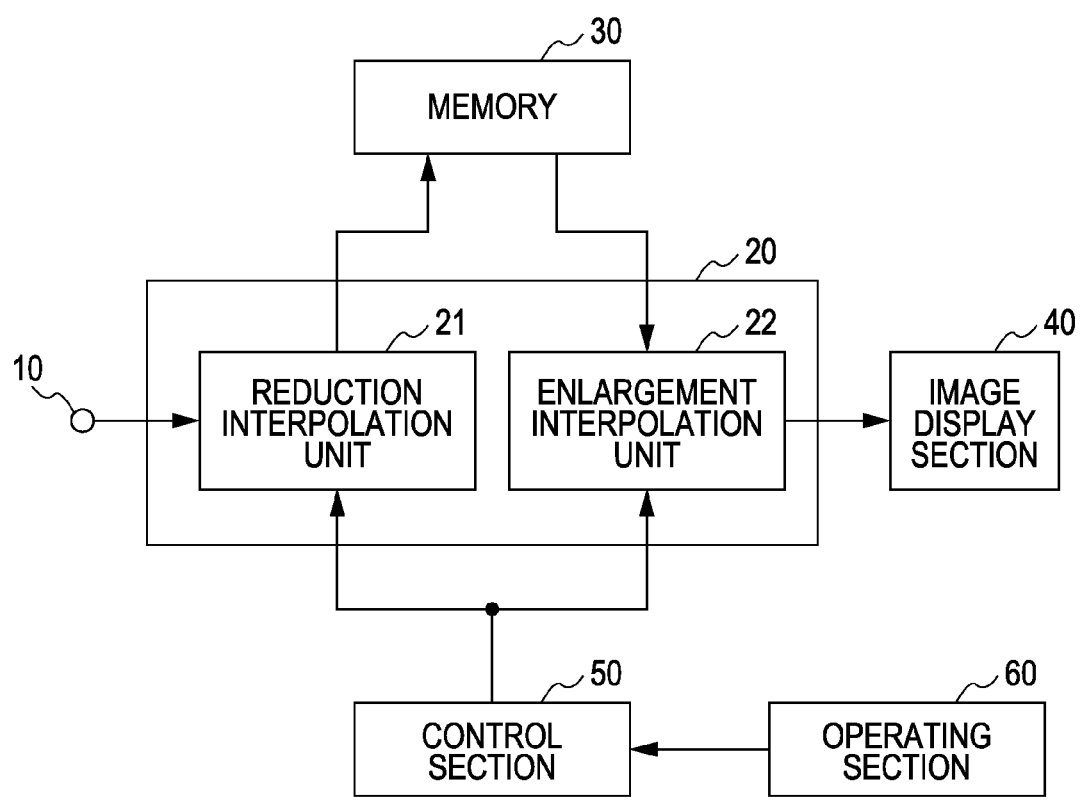
FIG. 1 is a block diagram schematically illustrating an exemplary configuration of an image display apparatus according to a first embodiment of the present invention.

FIG. 1 is a block diagram schematically illustrating an exemplary configuration of an image display apparatus according to this embodiment. Referring to FIG. 1, an image display apparatus according to this embodiment includes an image signal input section 10, a scaling section 20 for enlarging or reducing an input image, a frame memory 30, an image display section 40 including a display device and a driver for the display device, a control section 50 for controlling an image display apparatus including the scaling section 20, and an operating section 60 for performing a control operation of the image display apparatus. The scaling section 20 includes a reduction interpolation unit 21 and an enlargement interpolation unit 22.

If an input image is reduced, the reduction interpolation unit 21 performs reduction interpolation processing upon image signals corresponding to an input image by performing predetermined filtering based on a reduction ratio controlled by the control section 50, and stores the image signals in the frame memory 30. The enlargement interpolation unit 22 reads out the image signals stored in the frame memory 30, and outputs the image signals to the image display section 40 without processing them.

If an input image is enlarged, the reduction interpolation unit 21 stores image signals corresponding to an input image in the frame memory 30 without processing them. The enlargement interpolation unit 22 reads out the image signals stored in the frame memory 30, performs enlargement interpolation processing upon the image signals by performing predetermined filtering based on an enlargement ratio controlled by the control section 50, and outputs the image signals to the image display section 40.

If any of the reduction interpolation processing and the enlargement interpolation processing are not performed, an input image is output to the image display section 40 as same-magnification image signals. Each of the reduction interpolation processing, the enlargement interpolation processing, and the writing/reading of data in/from the frame memory 30 is performed under the control of the control section 50.

An input image (image signal) input from the image signal input section 10 is digital data including a horizontal synchronization signal Hs, a vertical synchronization signal Vs, and a pixel clock signal DCK. Writing of data in the frame memory 30 is performed in synchronization with these synchronization signals and the pixel clock signal. That is, each dot position (an address in the horizontal direction) is updated in synchronization with the pixel clock signal DCK, each scanning line position (an address in the vertical direction) is updated in synchronization with the horizontal synchronization signal Hs, and each frame is updated in synchronization with the vertical synchronization signal Vs.

The reading of data from the frame memory 30 is performed in synchronization with a horizontal synchronization signal Hs2, a vertical synchronization signal Vs2, and a pixel clock signal DCK2 which are generated by a reading synchronization signal generation unit (not illustrated) included in the scaling section 20. These reading synchronization signals and the pixel clock signal are output to the image display section 40, and are also used as synchronization signals for the display device therein. The scaling section 20 performs the reduction interpolation processing and the enlargement interpolation processing based on a data writing address and a data reading address which are controlled by the control section 50.

Next, an image display method according to this embodiment will be described with reference to FIGS. 2 and 3. First, a screen move mode is set by operating an operation key included in the operating section 60. In the screen move mode, a screen display position is moved in accordance with the number of times the operation key is pressed, which is illustrated in FIG. 3 and is included in the operating section 60, or a pressing duration of the operation key.

Figure 2:
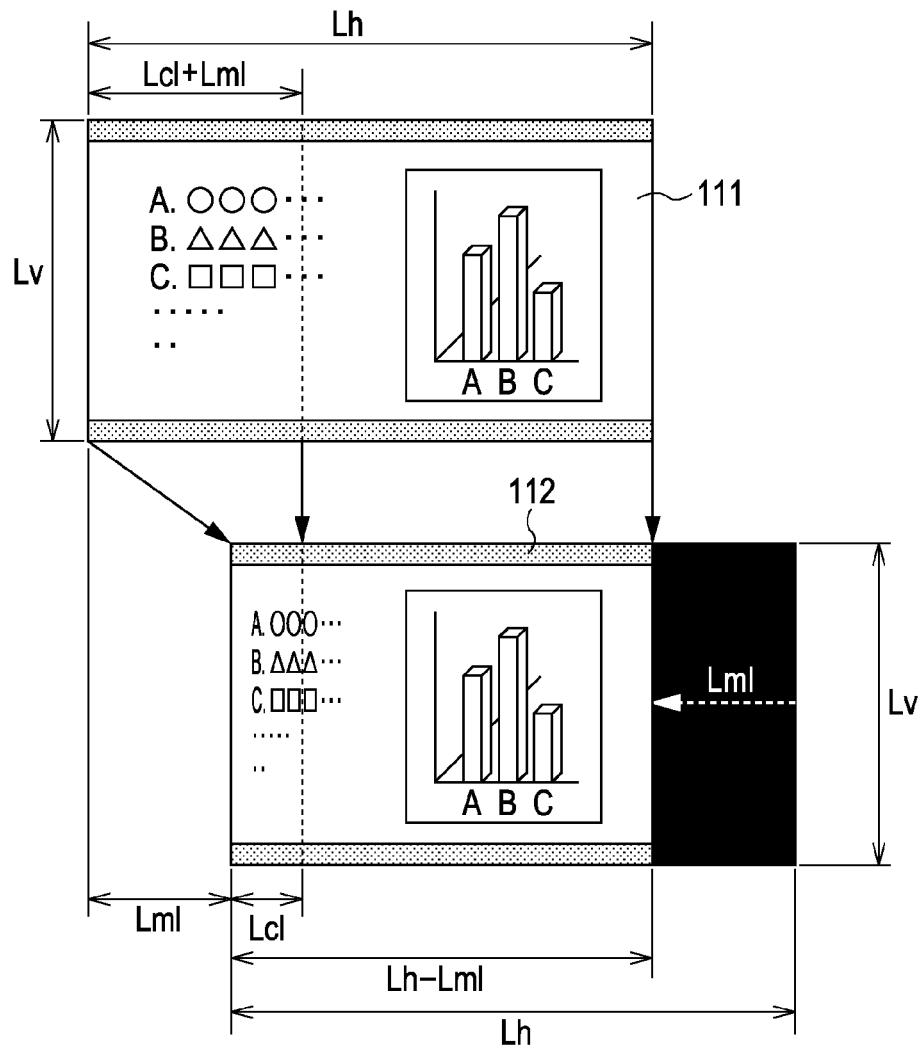
FIG. 2 is a diagram illustrating a display example of a screen according to the first embodiment of the present invention when the screen is moved to the left.
Figure 3:
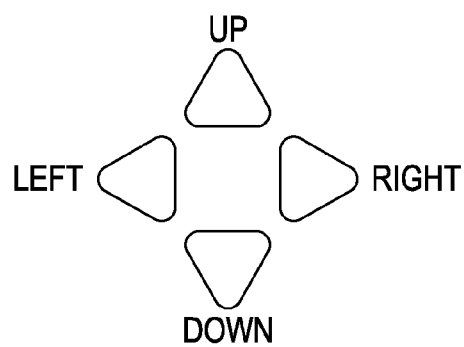
FIG. 3 is a diagram illustrating an operation key according to the first embodiment of the present invention.

For example, as illustrated in FIG. 2, on an image display device (display screen) having Lh pixels in the horizontal direction and Lv pixels in the vertical direction, an image 111 having the same number of pixels as the image display device is input. As illustrated using an image 112, a display position is moved to the left in the horizontal direction by a distance Lml. That is, a nondisplay area having the length of Lml in the moving direction of the image is generated. At that time, an area of the image display device from the left end thereof to a position apart from the left end by a distance Lcl in the horizontal direction is set as a compressed image display area.

In this case, a part of the input image 111 in an area from the left end thereof to a position apart from the left end by a distance (Lcl+Lml) in the horizontal direction is compressed for display so that the part fits within the area of the image display device from the left end thereof to the position apart from the left end by the distance Lcl in the horizontal direction. Accordingly, after the display position has been moved, in the area of the image display device from the left end thereof to the position apart from the left end by the distance Lcl in the horizontal direction, an image obtained by compressing the part of the input image 111 in the area from the left end thereof to the position apart from the left end by the distance (Lcl+Lml) in the horizontal direction at a compression ratio of Lcl/(Lcl+Lml) is displayed. If Lcl is larger than Lml, image compression is performed using a compression ratio of (Lcl−Lml)/Lcl.

On the other hand, after the display position has been moved, in an area of the image display device from the position apart from the left end thereof by the distance Lcl in the horizontal direction to a position apart from the left end by a distance (Lh−Lml) in the horizontal direction, a part of the input image 111 on the right side of the position apart from the left end thereof by the distance (Lcl+Lml) in the horizontal direction is displayed without being compressed. After the display position has been moved, in an area of the image display device on the right side of the position apart from the left end thereof by the distance (Lh−Lml) in the horizontal direction, for example, a black blank image is displayed.

Figure 4:
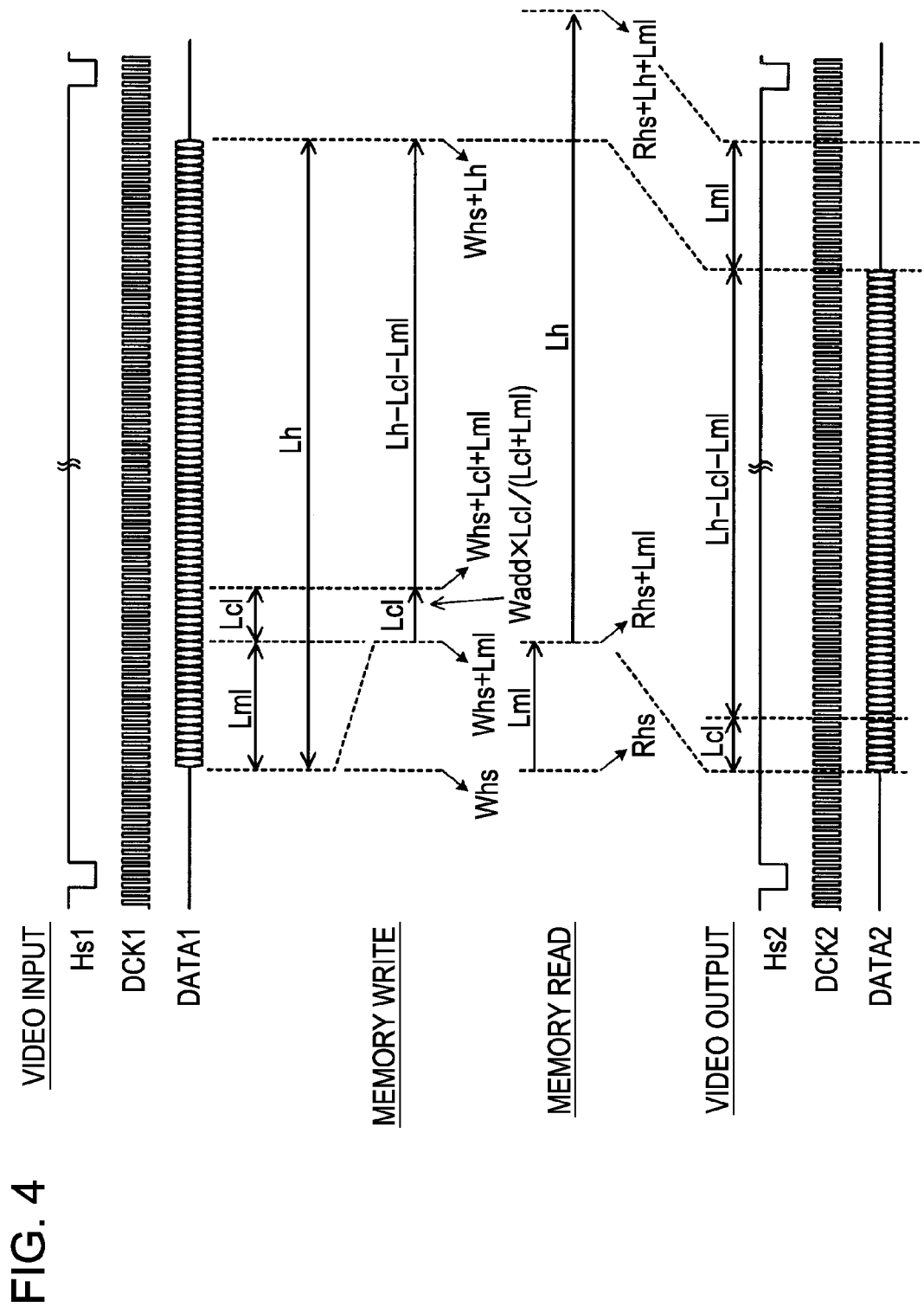
FIG. 4 is a diagram illustrating an example of the time at which writing/reading of data in/from a memory according to the first embodiment of the present invention is performed.

FIG. 4 is a diagram illustrating an example of the time at which writing/reading of data in/from the frame memory 30 according to this embodiment is performed.

Referring to FIG. 4, Hs1 denotes an input horizontal synchronization signal, DCK1 denotes an input pixel clock signal, DATA1 denotes an input image signal, Hs2 denotes an output horizontal synchronization signal, DCK2 denotes an output pixel clock signal, and DATA2 denotes an output image signal.

If a display position is not moved in the horizontal direction, an address Whs corresponding to the number of pixel clocks between a falling edge of the input horizontal synchronization signal Hs1 and the start of the effective image area of an input image is stored in the frame memory 30 as an input image signal functioning as a horizontal data writing start address. Input image signals corresponding to the number of effective pixels are written in the frame memory 30 by incrementing the address Whs until a horizontal data writing address (Whs+Lh) is obtained.

At the time of reading of data from the frame memory 30, based on a falling edge of the output horizontal synchronization signal Hs2, a horizontal data reading start address Rhs is set. The image signals corresponding to the number of effective pixels are read out from the frame memory 30 by incrementing the address Rhs until a horizontal data reading address (Rhs+Lh) is obtained. Consequently, the input image can be displayed on the entire area of the image display device.

If the display position is moved to the left by the distance Lml in the horizontal direction, an address (Whs+Lml) obtained by adding the distance Lml to the horizontal data writing start address Whs, which is a horizontal data writing start address in a case in which the display position is not moved, is set as a horizontal data writing start address. Subsequently, reduction interpolation processing is performed upon input image signals obtained in a period corresponding to the sum of the distance Lml and the distance Lcl functioning as the length of the compressed image display area in the horizontal direction (a part of the input image excluding a normal display area). Image signals are written in the frame memory 30 by incrementing the horizontal data writing start address (Whs+Lml) by a value obtained by multiplying a position in the input image by Lcl/(Lcl+Lml) until a horizontal data writing address (Whs+Lml+Lcl) is obtained.

However, since a data writing address is an integer in reality, the horizontal data writing start address (Whs+Lml) is incremented until the horizontal data writing address (Whs+Lml+Lcl) is obtained. After a period corresponding to (Lml+Lcl) has elapsed from the start of the effect image area of the input image, image signals are sequentially obtained by incrementing the horizontal data writing address (Whs+Lml+Lcl) until a horizontal data writing address (Whs+Lh) is obtained, and are then sequentially written in the frame memory 30.

At the time of reading of data from the frame memory 30, an address (Rhs+Lml) obtained by adding the distance Lml to the horizontal data reading start address Rhs, which is a horizontal data reading start address in a case in which the display position is not moved, is set as a horizontal data reading start address. Subsequently, image signals corresponding to the number of effective pixels Lh are read out by incrementing the horizontal data reading start address (Rhs+Lml) until a horizontal data reading address (Rhs+Lh+Lml) is obtained.

Consequently, a part of the input image 111 from the left end thereof to the position apart from the left end by the distance (Lcl+Lml) is compressed so as to obtain a compressed image, and the compressed image is displayed in the compressed image display area of the length Lcl in the display screen. Furthermore, a part of the input image 111 in an area from the position apart from the left end thereof by the distance (Lcl+Lml) to a position apart from the left end by the distance Lh is displayed in the normal display area of the display screen from the position apart from the left end thereof by the distance Lcl to the position apart from the left end by the distance (Lh−Lml). In the area of the display screen from the position apart from the left end thereof by the distance (Lh−Lml) to the position apart from the left end by the distance Lh, a blank image is displayed.

Thus, if an image display position on a display screen is moved to the left in the horizontal direction, a part of an image to be extended off the display screen is compressed for display so that the part fits within a compressed image display area. As a result, all the information contained within the image can be displayed without loss of the information. In this embodiment, by operating a key included in the operating section 60, a display position is moved. However, for example, if the image display apparatus includes an operating section including a remote controller, the movement of the display position may be performed by performing a key operation of the remote controller.

Second Embodiment

Figure 5:
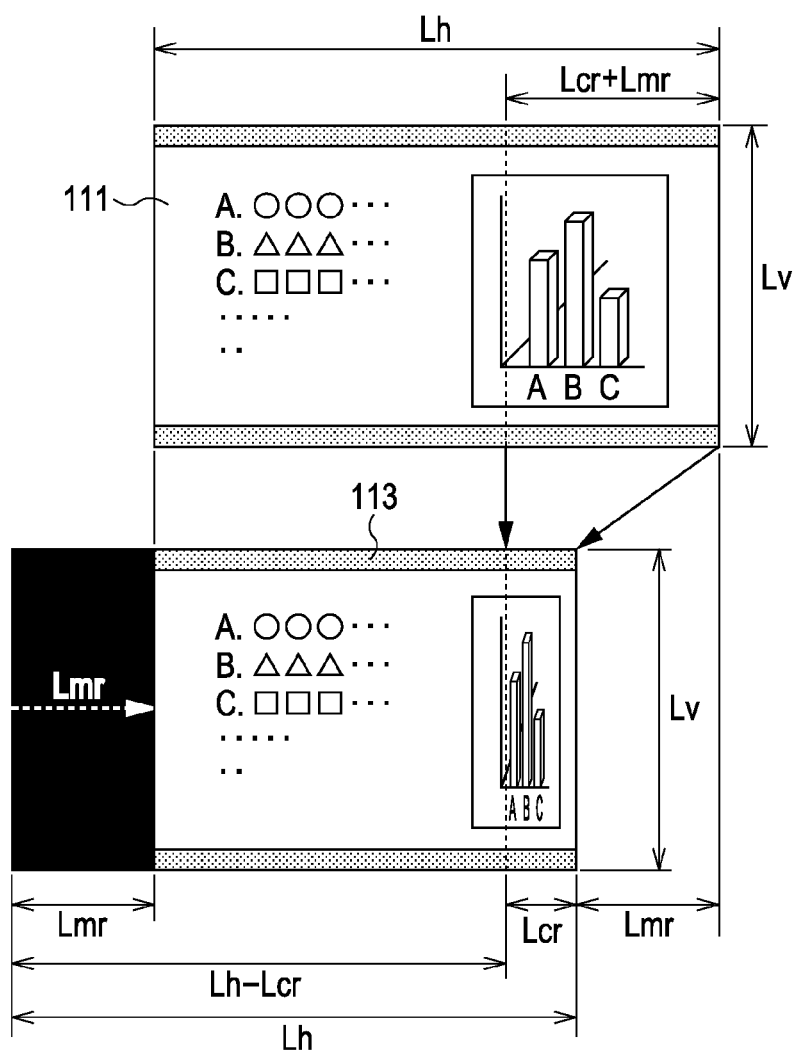
FIG. 5 is a diagram illustrating a display example of a screen according to a second embodiment of the present invention when the screen is moved to the right.

Next, an example illustrated in FIG. 5 will be described. In this example, on an image display device having Lh pixels in the horizontal direction and Lv pixels in the vertical direction, the image 111 having the same number of pixels as the image display device is input. As illustrated using an image 113, a display position is moved to the right by a distance Lmr in the horizontal direction. The exemplary functional configuration of an image display apparatus according to this embodiment is the same as that of an image display apparatus according to the first embodiment, and the description thereof will be therefore omitted. An area of the image display device from the right end thereof to a position apart from the right end by a distance Lcr in the horizontal direction is set as a compressed image display area.

In this case, a part of the input image 111 in an area from the right end thereof to a position apart from the right end by a distance (Lcr+Lmr) in the horizontal direction is compressed for display so that the part fits within the area of the image display device from the right end thereof to the position apart from the right end by the distance Lcr in the horizontal direction. Accordingly, after the display position has been moved, in the area of the image display device from the right end thereof to the position apart from the right end by the distance Lcl in the horizontal direction, an image obtained by compressing the part of the input image 111 in the area from the right end thereof to the position apart from the right end by the distance (Lcr+Lmr) in the horizontal direction at a compression ratio of Lcr/(Lcr+Lmr) is displayed.

On the other hand, in an area of the image display device from the position apart from the right end thereof by the distance Lcr in the horizontal direction to a position apart from the right end by a distance (Lh−Lmr) in the horizontal direction, a part of the input image 111 on the left side of the position apart from the right end thereof by the distance (Lcr+Lmr) in the horizontal direction is displayed without being compressed. In an area of the image display device on the left side of the position apart from the right end thereof by the distance (Lh−Lmr) in the horizontal direction, for example, a black blank image is displayed.

Figure 6:
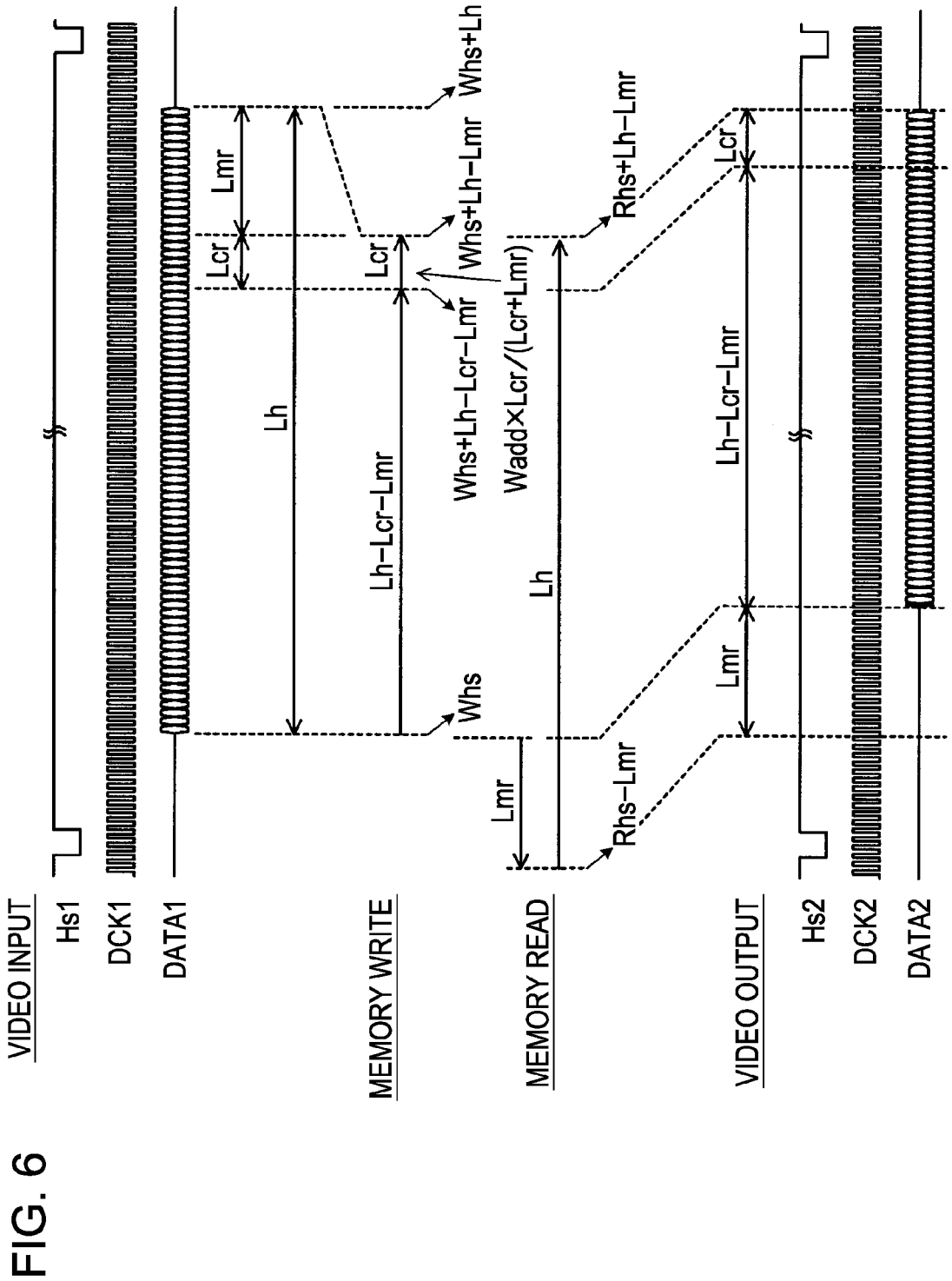
FIG. 6 is a diagram illustrating an example of the time at which writing/reading of data in/from a memory according to the second embodiment of the present invention is performed.

FIG. 6 is a diagram illustrating an example of the time at which writing/reading of data in/from the frame memory 30 according to this embodiment is performed.

If the display position is moved to the right by the distance Lmr in the horizontal direction, an address Whs that is a horizontal data writing start address in a case in which the display position is not moved is set as a horizontal data writing start address.

Until a period corresponding to (Lh−Lmr−Lcr) has elapsed from the start of the effective image area of an input image, image signals are sequentially obtained by incrementing the horizontal data writing start address Whs until a horizontal data writing address (Whs+Lh−Lcr−Lmr) is obtained, and are then sequentially written in the frame memory 30. Subsequently, reduction interpolation processing is performed upon input image signals obtained in a period corresponding to the sum of the distance Lmr and the distance Lcr functioning as the length of a compressed image display area in the horizontal direction. Image signals are written in the frame memory 30 by incrementing the horizontal data writing address (Whs+Lh−Lcr−Lmr) by a value obtained by multiplying a position in the input image by Lcr/(Lcr+Lmr) until a horizontal data writing address (Whs+Lh−Lmr) is obtained.

However, since a data writing address is an integer in reality, the horizontal data writing address (Whs+Lh−Lcr−Lmr) is incremented until the horizontal data writing address (Whs+Lh−Lmr) is obtained.

At the time of reading of data from the frame memory 30, an address (Rhs−Lmr) obtained by subtracting the distance Lmr from a horizontal data reading start address Rhs, which is a horizontal data reading start address in a case in which the display position is not moved, is set as a horizontal data reading start address. Subsequently, image signals corresponding to the number of effective pixels Lh are read out by incrementing the horizontal data reading start address (Rhs−Lmr) until a horizontal data reading address (Rhs+Lh−Lmr) is obtained.

Consequently, after the display position has been moved, a blank image is displayed in an area of the display screen from the left end thereof to a position apart from the left end by the distance Lmr in the horizontal direction. A part of the input image 111 in an area from the left end thereof to the position apart from the left end by the distance (Lh−Lcr−mr) in the horizontal direction is displayed without being compressed in the normal display area of the display screen from the position apart from the left end thereof by the distance Lmr in the horizontal direction to a position apart from the left end by a distance (Lh−Lcr) in the horizontal direction. Furthermore, a part of the image 111 in an area from the position apart from the left end thereof by the distance (Lh−Lcr−Lmr) in the horizontal direction to the position apart from the left end by the distance Lh in the horizontal direction is compressed so as to obtain a compressed image, and the compressed image is displayed in the compressed image display area of the display screen from the position apart from the left end thereof by the distance (Lh−Lcr) in the horizontal direction to the position apart from the left end by the distance Lh in the horizontal direction. Thus, if an image display position on a display screen is moved to the right in the horizontal direction, a part of an image to be extended off the display screen is compressed for display so that the part fits within a compressed image display area. As a result, all the information contained within the image can be displayed without loss of the information.

Third Embodiment

Figure 7:
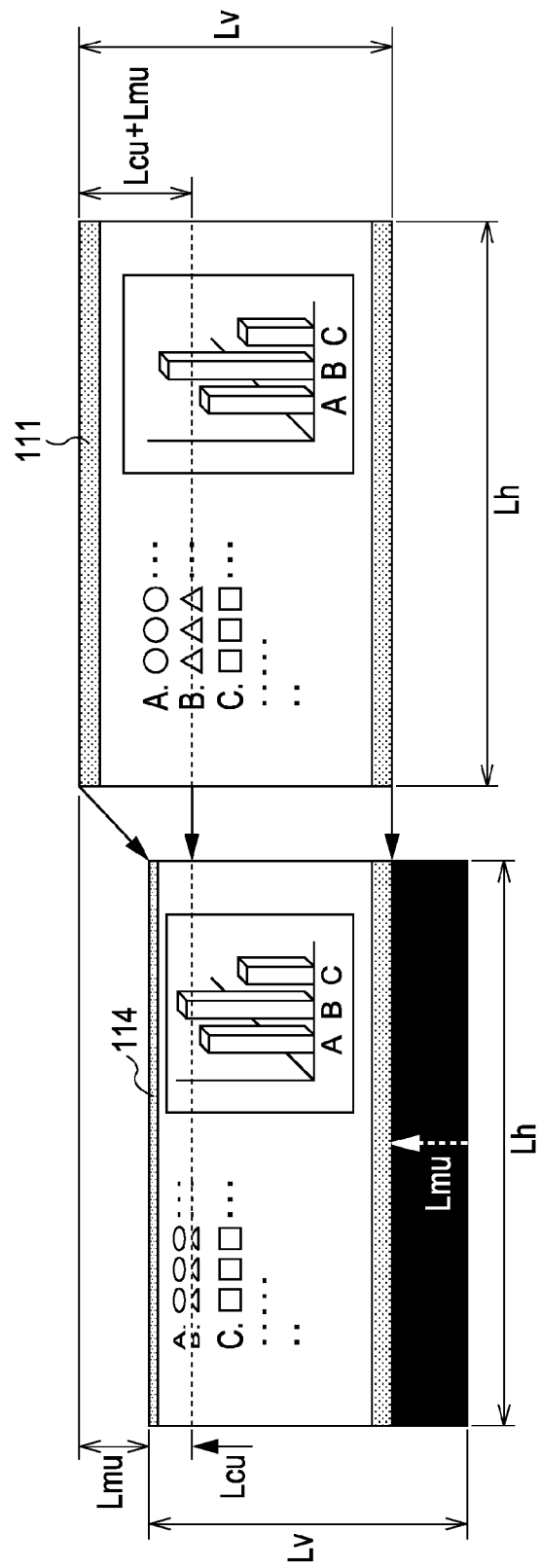
FIG. 7 is a diagram illustrating a display example of a screen according to a third embodiment of the present invention when the screen is upwardly moved.

Next, an example illustrated in FIG. 7 will be described. In this example, on an image display device having Lh pixels in the horizontal direction and Lv pixels in the vertical direction, the image 111 having the same number of pixels as the image display device is input. As illustrated using an image 114, a display position is upwardly moved in the vertical direction by a distance Lmu. The exemplary functional configuration of an image display apparatus according to this embodiment is the same as that of an image display apparatus according to the first embodiment, and the description thereof will be therefore omitted. An area of the image display device from the upper end thereof to a position apart from the upper end by a distance Lcu in the vertical direction is set as a compressed image display area.

In this case, a part of the input image 111 in an area from the upper end thereof to a position apart from the upper end by a distance (Lcu+Lmu) in the vertical direction is compressed for display so that the part fits within the area of the image display device from the upper end thereof to the position apart from the upper end by the distance Lcu in the vertical direction. Accordingly, in the area of the image display device from the upper end thereof to the position apart from the upper end by the distance Lcu in the vertical direction, an image obtained by compressing the part of the input image 111 in the area from the upper end thereof to the position apart from the upper end by the distance (Lcu+Lmu) in the vertical direction at a compression ratio of Lcu/(Lcu+Lmu) is displayed.

On the other hand, in an area of the image display device from the position apart from the upper end thereof by the distance Lcu in the vertical direction to a position apart from the upper end by a distance (Lv−Lmu) in the vertical direction, a part of the input image 111 on the lower side of the position apart from the upper end thereof by the distance (Lcu+Lmu) in the vertical direction is displayed without being compressed. In an area of the image display device on the lower side of the position apart from the upper end thereof by the distance (Lv−Lmu) in the vertical direction, for example, a black blank image is displayed.

Figure 8:
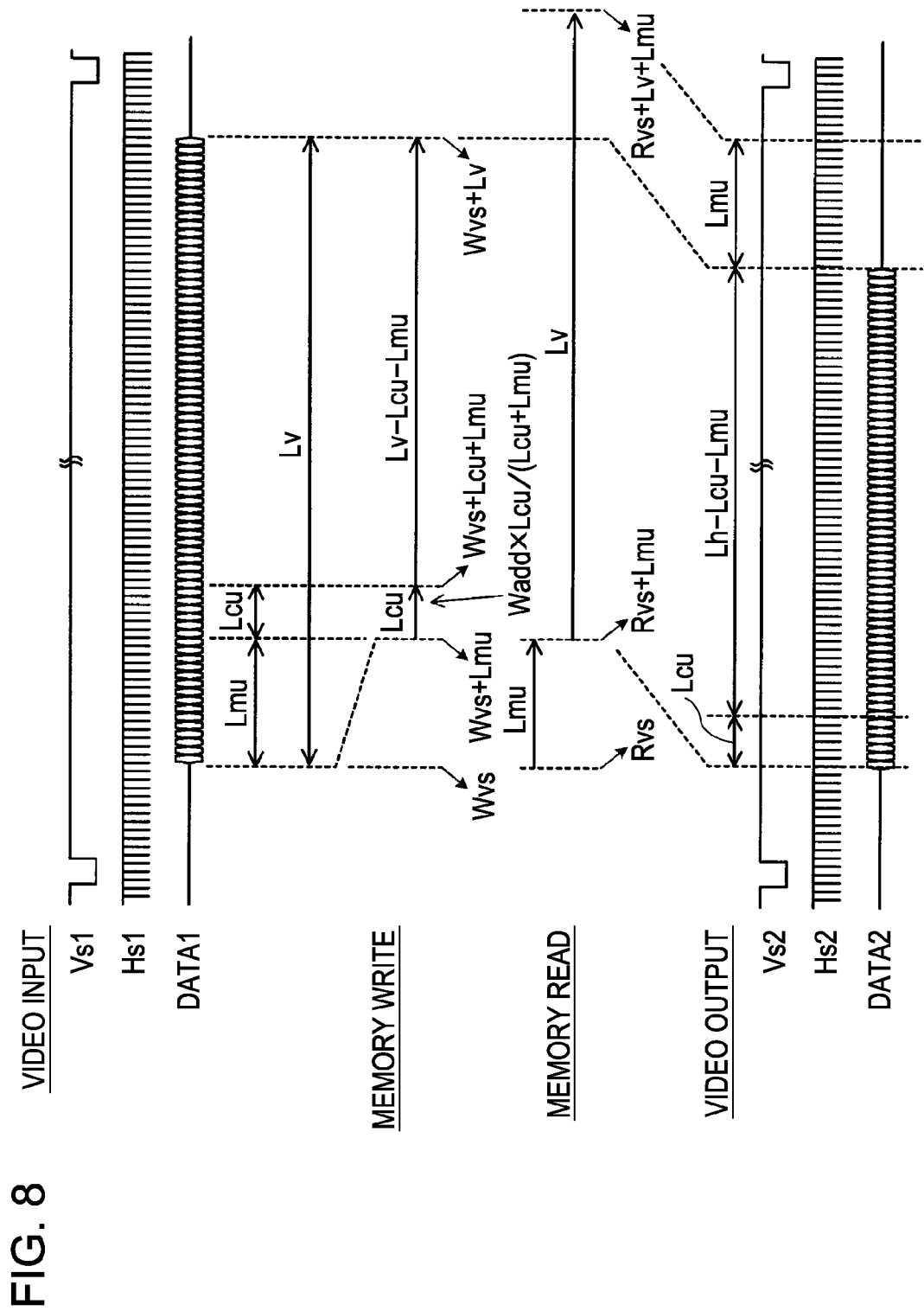
FIG. 8 is a diagram illustrating an example of the time at which writing/reading of data in/from a memory according to the third embodiment of the present invention is performed.

FIG. 8 is a diagram illustrating an example of the time at which writing/reading of data in/from the frame memory 30 according to this embodiment is performed.

Referring to FIG. 8, Vs1 denotes an input vertical synchronization signal, Hs1 denotes the input horizontal synchronization signal, DATA1 denotes the input image signal, Vs2 denotes an output vertical synchronization signal, Hs2 denotes the output horizontal synchronization signal, and DATA2 denotes the output image signal.

If a display position is not moved in the vertical direction, an address Wvs corresponding to the number of horizontal synchronization signals between a falling edge of the input vertical synchronization signal Vs1 and the start of the effective image area of an input image is stored in the frame memory 30 as an input image signal functioning as a vertical data writing start address. Input image signals corresponding to the number of effective lines are written in the frame memory 30 by incrementing the address Wvs until a vertical data writing address (Wvs+Lv) is obtained.

At the time of reading of data from the frame memory 30, based on a falling edge of the output vertical synchronization signal Vs2, a vertical data reading start address Rvs is set, and image signals corresponding to the number of effective lines are read out from the frame memory 30 by incrementing the address Rvs until a vertical data writing address (Rvs+Lv) is obtained. Consequently, the input image can be displayed on the entire area of the image display device.

If the display position is upwardly moved by the distance Lmu in the vertical direction, an address Wvs, which is a vertical data writing start address in a case in which the display position is not moved, is set as a vertical data writing start address. Subsequently, reduction interpolation processing is performed upon input image signals obtained in a period corresponding to the sum of the distance Lmu and the distance Lcu functioning as the length of the compressed image display area in the vertical direction. That is, Image signals are written in the frame memory 30 by incrementing the vertical data writing start address Wvs by a value obtained by multiplying a position in the input image by Lcu/(Lcu+Lmu) until a vertical data writing address (Wvs+Lmu+Lcu) is obtained.

However, since a data writing address is an integer in reality, a vertical data writing address (Wvs+Lmu) is incremented until the vertical data writing address (Wvs+Lmu+Lcu) is obtained. After the period corresponding to (Lmu+Lcu) has elapsed from the start of the effective image area of the input image, image signals are sequentially obtained by incrementing the vertical data writing address (Wvs+Lmu+Lcu) until a vertical data writing address (Wvs+Lv) is obtained, and are then sequentially written in the frame memory 30.

At the time of reading of data from the frame memory 30, an address (Rvs+Lmu) obtained by adding the distance Lmu to the vertical data reading start address Rvs, which is a vertical data reading start address in a case in which the display position is not moved, is set as a vertical data reading start address. Subsequently, image signals corresponding to the number of effective lines Lv are read out by incrementing the vertical data reading start address (Rvs+Lmu) until a vertical data reading address (Rvs+Lv+Lmu) is obtained.

Consequently, a part of the input image 111 in an area from the upper end thereof to the position apart from the upper end by the distance (Lcu+Lmu) is compressed so as to obtain a compressed image, and the compressed image is displayed in the compressed image display area of the length Lcu in the vertical direction in the display screen. A part of the image 111 in an area from the position apart from the upper end thereof by the distance (Lcu+Lmu) to a position apart from the upper end by the distance Lv is displayed without being compressed in the normal display area of the display screen from the position apart from the upper end thereof by the distance Lcu to the position apart from the upper end by the distance (Lv−Lmu). Furthermore, in an area of the display screen from the position apart from the upper end thereof by the distance (Lv−Lmu) to the position apart from the upper end by the distance LV, a blank image is displayed. Thus, if an image display position on a display screen is upwardly moved in the vertical direction, a part of an image to be extended off the display screen is compressed for display so that the part fits within a compressed image display area. As a result, all the information contained within the image can be displayed without loss of the information.

Fourth Embodiment

Figure 9:
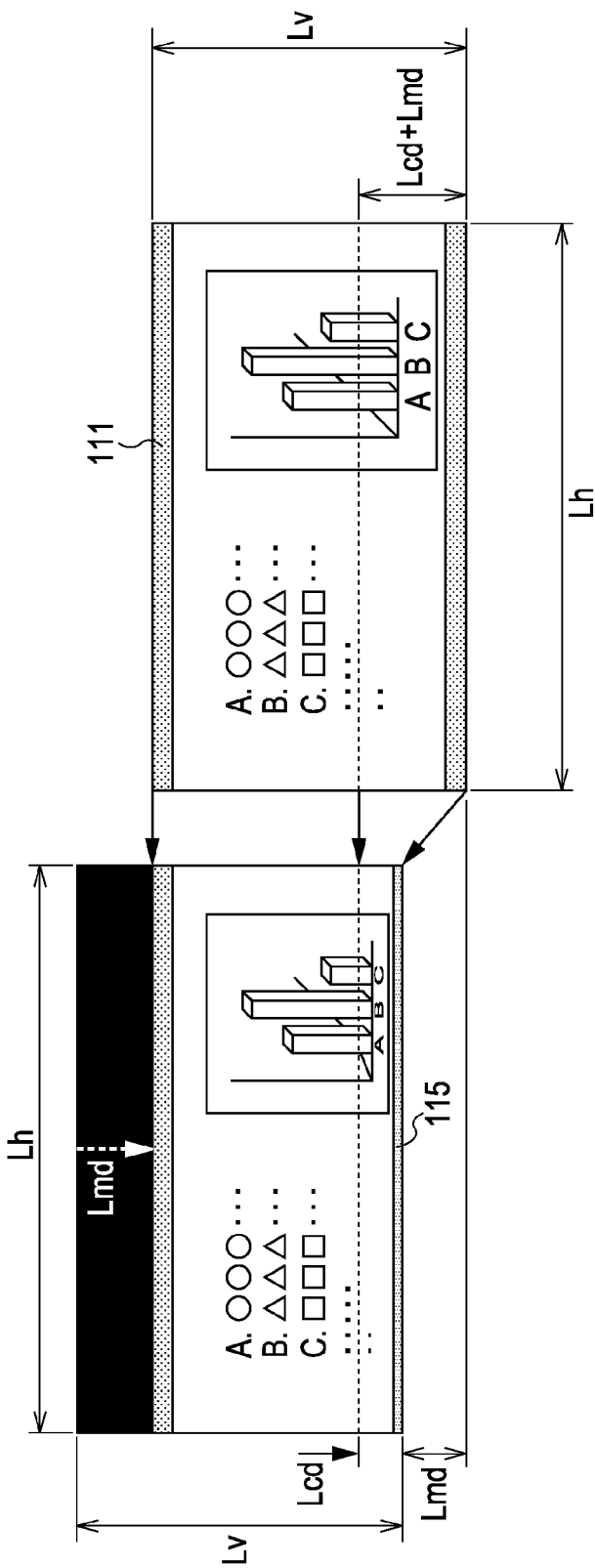
FIG. 9 is a diagram illustrating a display example of a screen according to a fourth embodiment of the present invention when the screen is downwardly moved.

Next, an example illustrated in FIG. 9 will be described. In this example, on an image display device having Lh pixels in the horizontal direction and Lv pixels in the vertical direction, the image 111 having the same number of pixels as the image display device is input. As illustrated using an image 115, a display position is downwardly moved in the vertical direction by a distance Lmd. The exemplary functional configuration of an image display apparatus according to this embodiment is the same as that of an image display apparatus according to the first embodiment, and the description thereof will be therefore omitted. An area of the image display device from the lower end thereof to a position apart from the lower end by a distance Lcd in the vertical direction is set as a compressed image display area.

In this case, a part of the input image 111 in an area from the lower end thereof to a position apart from the lower end by a distance (Lcd+Lmd) in the vertical direction is compressed for display so that the part fits within the area of the image display device from the lower end thereof to the position apart from the lower end by the distance Lcd in the vertical direction. Accordingly, in the area of the image display device from the lower end thereof to the position apart from the lower end by the distance Lcd in the vertical direction, an image obtained by compressing the part of the input image 111 in the area from the lower end thereof to the position apart from the lower end by the distance (Lcd+Lmd) in the vertical direction at a compression ratio of Lcd/(Lcd+Lmd) is displayed.

On the other hand, in an area of the image display device from the position apart from the lower end thereof by the distance Lcd in the vertical direction to a position apart from the lower end by a distance (Lv−Lmd) in the vertical direction, a part of the input image 111 on the upper side of the position apart from the lower end thereof by the distance (Lcd+Lmd) in the vertical direction is displayed without being compressed. In an area of the image display device on the upper side of the position apart from the lower end thereof by the distance (Lv−Lmd) in the vertical direction, for example, a black blank image is displayed.

Figure 10:
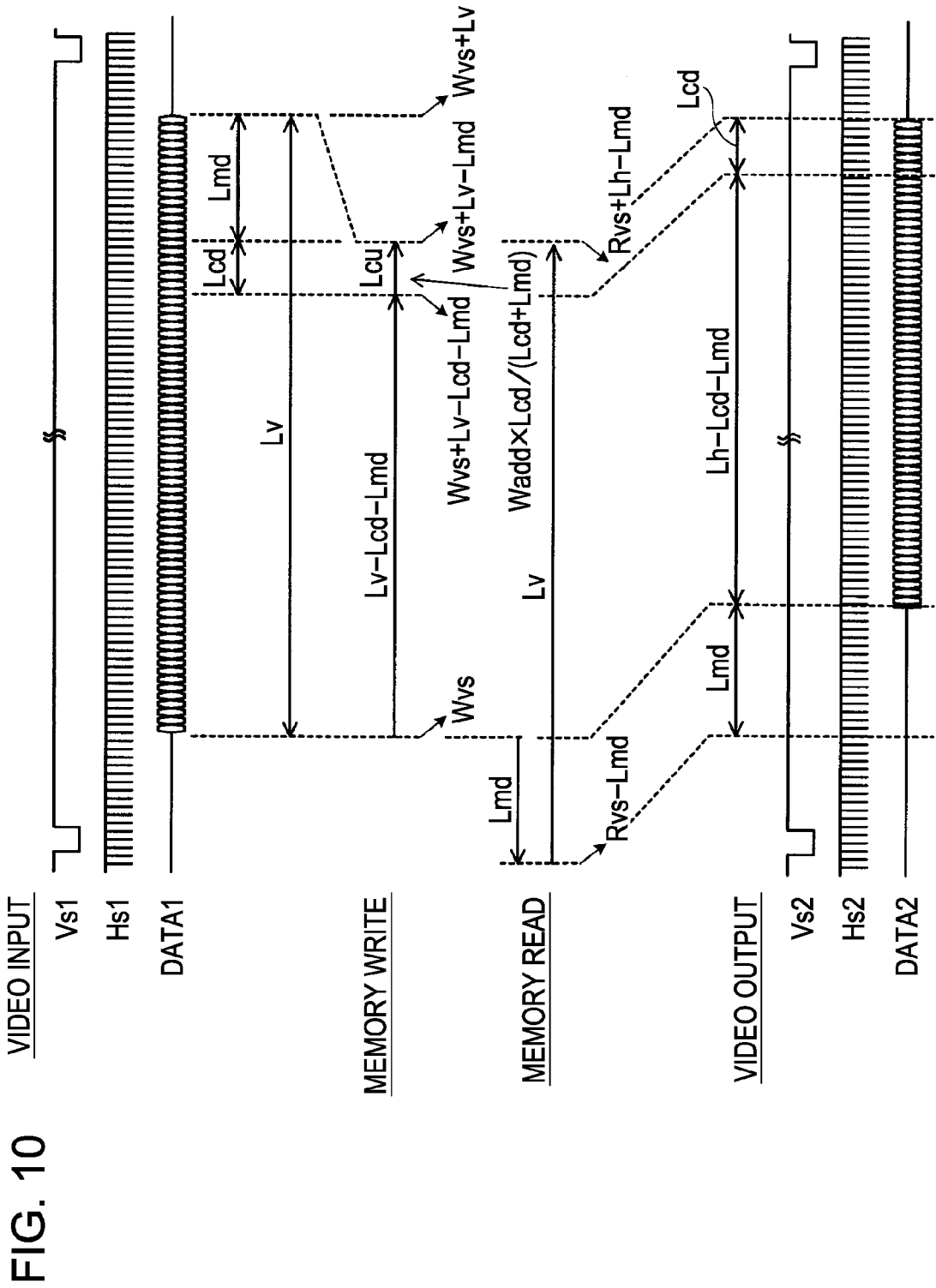
FIG. 10 is a diagram illustrating an example of the time at which writing/reading of data in/from a memory according to the fourth embodiment of the present invention is performed.
Figure 11:
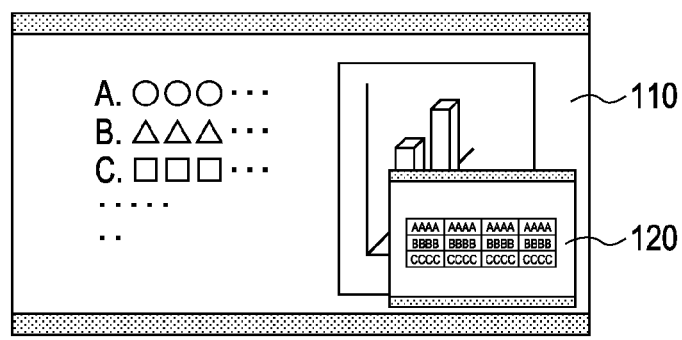
FIG. 11 is a diagram illustrating a display example of a screen using a multi-screen display function in the related art.
Figure 12:
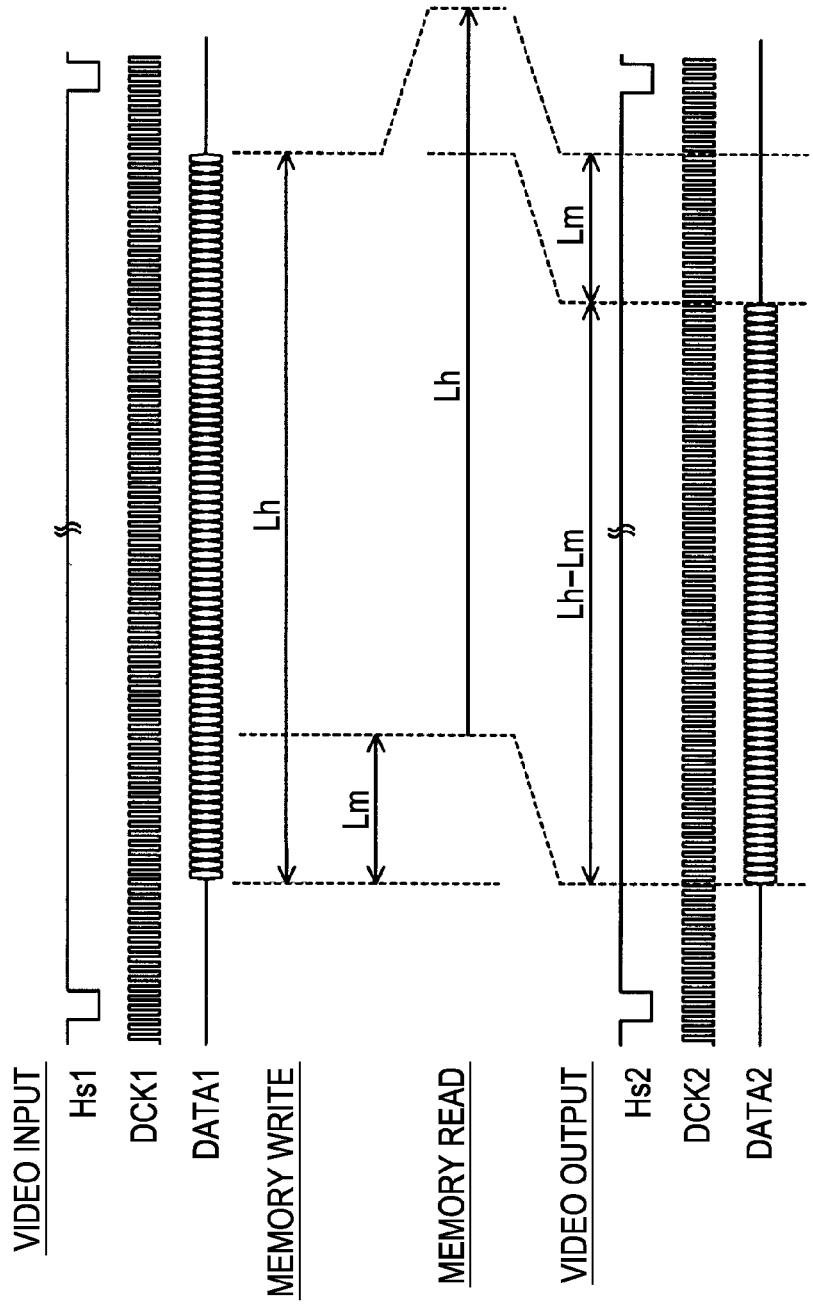
FIG. 12 is a diagram illustrating an example of the time at which writing/reading of data in/from a memory is performed in screen display position movement in the related art.
Figure 13:
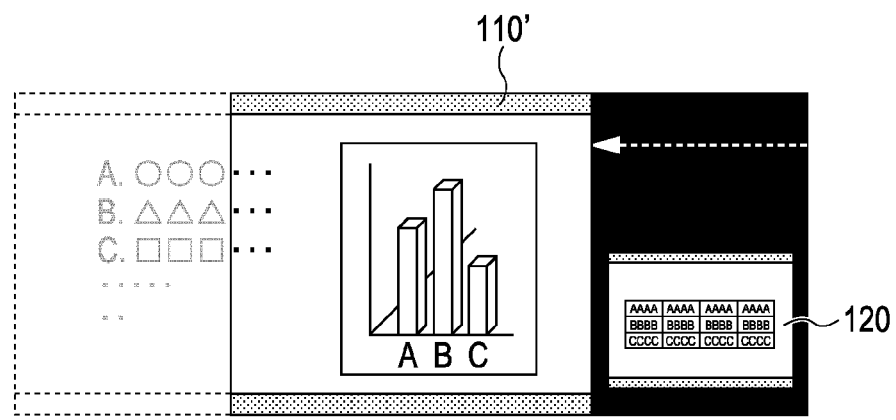
FIG. 13 is a diagram illustrating a display example of a screen in screen display position movement in the related art.
Figure 14:
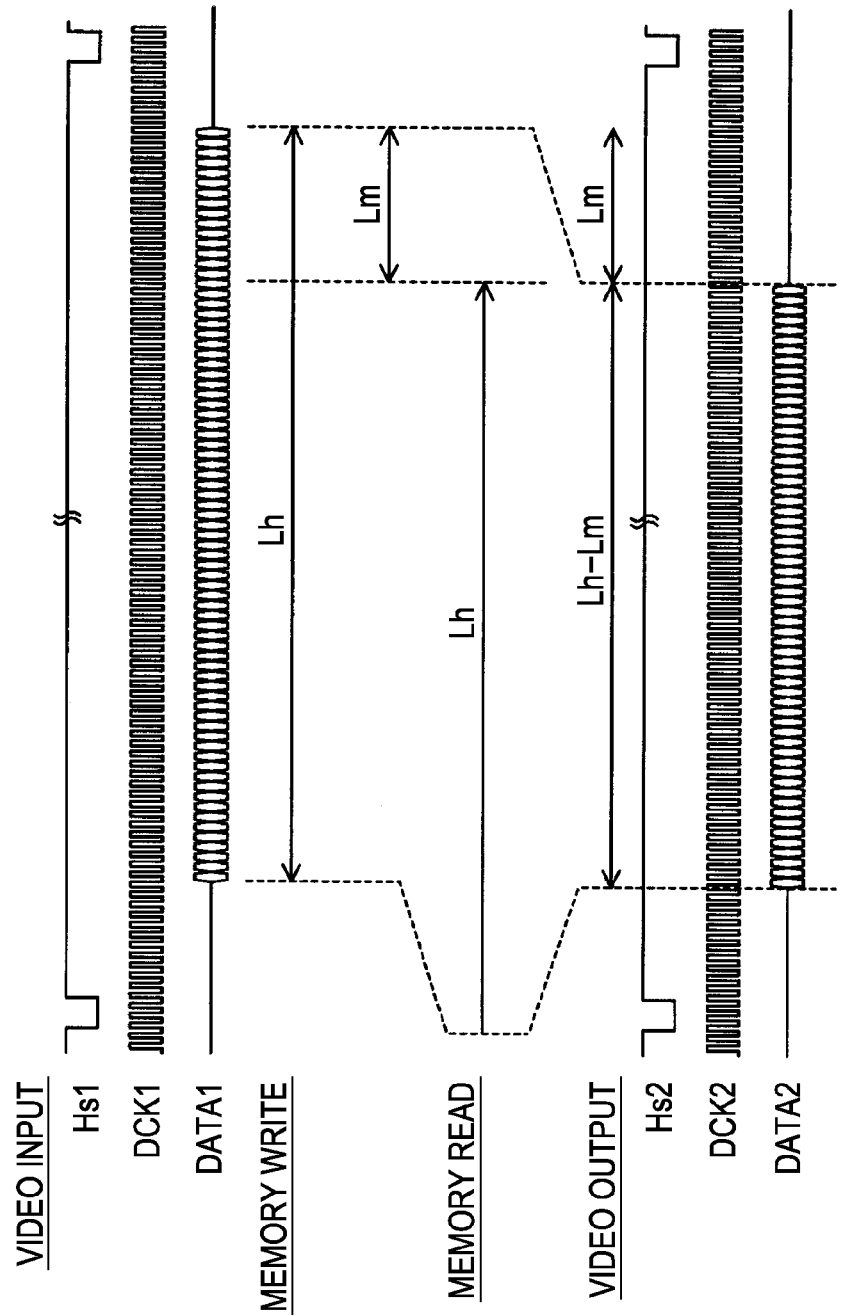
FIG. 14 is a diagram illustrating an example of the time at which writing/reading of data in/from a memory is performed in screen display position movement in the related art.

FIG. 10 is a diagram illustrating an example of the time at which writing/reading of data in/from the frame memory 30 according to this embodiment is performed.

If the display position is downwardly moved in the vertical direction by the distance Lmd, an address (Wvs−Lmd) obtained by subtracting the distance Lmd from a vertical data writing start address Wvs, which is a vertical data writing start address in a case in which the display position is not moved, is set as a vertical data writing start address.

Until a period corresponding to (Lv−Lmd−Lcd) has elapsed from the start of the effective image area of the input image, image signals are sequentially obtained by incrementing the vertical data writing start address (Wvs−Lmd) until a vertical data writing address (Wvs+Lv−Lcd−Lmd) is obtained, and are then sequentially written in the frame memory 30.

Subsequently, reduction interpolation processing is performed upon input image signals obtained in a period corresponding to the sum of the distance Lmd and the distance Lcd functioning as the length of the compressed image display area in the vertical direction. Image signals are written in the frame memory 30 by incrementing the vertical data writing address (Wvs+Lv−Lcd−Lmd) by a value obtained by multiplying a position in the input image by Lcd/(Lcd+Lmd) until a vertical data writing address (Wvs+Lv−Lmd) is obtained.

However, since a data writing address is an integer in reality, the vertical data writing address (Wvs+Lv−Lcd−Lmd) is incremented until the vertical data writing address (Wvs+Lv−Lmd) is obtained.

At the time of reading of data from the frame memory 30, an address (Rvs−Lmd) obtained by subtracting the distance Lmd from a vertical data reading start address Rvs, which is a vertical data reading start address in a case in which the display position is not moved, is set as a vertical data reading start address. Subsequently, image signals corresponding to the number of effective lines Lv are read out by incrementing the vertical data reading start address (Rvs−Lmd) until a vertical data reading address (Rvs+Lv−Lmd) is obtained.

Consequently, in an area of the image display device from the upper end thereof to a position apart from the upper end by the distance Lmd, a blank image is displayed. A part of the input image 111 from the upper end thereof to the position apart from the upper end by the distance (Lv−Lcd−Lmd) is displayed without being compressed in the normal display area of the image display device from the position apart from the upper end thereof by the distance Lmd to a position apart from the upper end by the distance (Lv−Lcd). A part of the input image 111 from the position apart from the upper end thereof by the distance (Lv−Lcd−Lmd) in the vertical direction to a position apart from the upper end by the distance Lv in the vertical direction is compressed for display so that the part fits within the area of the image display device from the position apart from the upper end thereof by the distance (Lv−Lcd) in the vertical direction to a position apart from the upper end by the distance Lv in the vertical direction. Thus, if an image display position on a display screen is downwardly moved in the vertical direction, a part of an image to be extended off the display screen is compressed for display so that the part fits within a compressed image display area. As a result, all the information contained within the image can be displayed without loss of the information.

Fifth Embodiment

Figure 15:
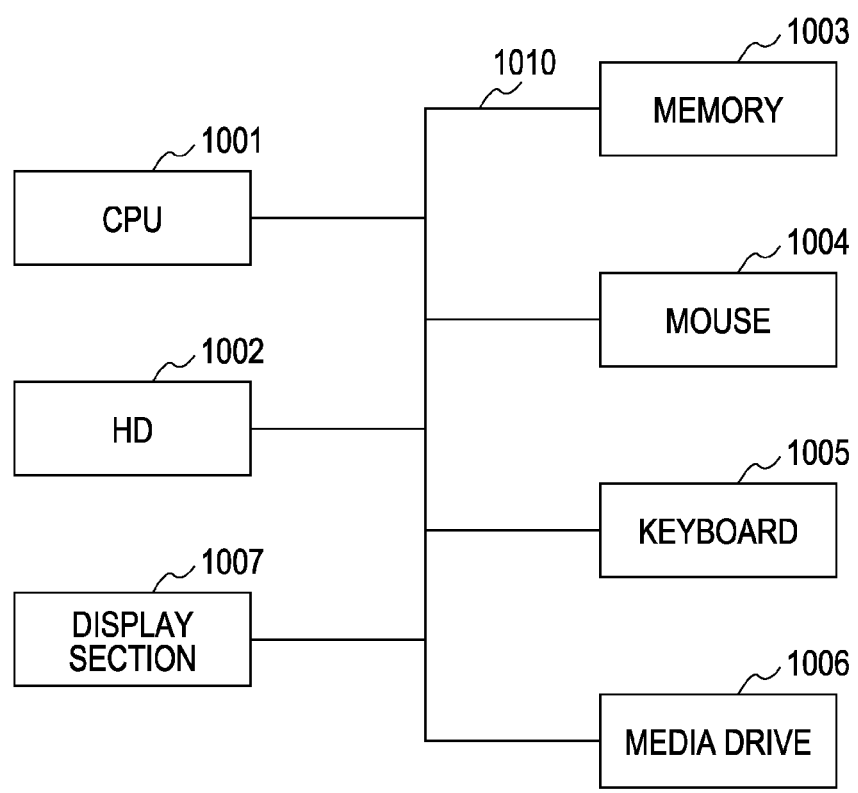
FIG. 15 is a block diagram illustrating an exemplary hardware configuration of a multi-window system in an image display apparatus according to a fifth embodiment of the present invention.

FIG. 15 is a block diagram illustrating a hardware configuration of a multi-window system of an image display apparatus according to the fifth embodiment. This system includes at least the following components: a central processing unit (CPU) 1001, a hard disk drive (HD) 1002, a memory 1003, a mouse 1004, a keyboard 1005, a media drive 1006, and a display section 1007. These components are connected to each other via a system bus 1010. The HD 1002 stores an OS (Operating System) and an application program. The mouse 1004 may be another component such as an on-screen digitizer capable of providing information about coordinates on a screen. The display section 1007 is a section for displaying screen information generated by the multi-window system, and does not define a display device.

Figure 16:
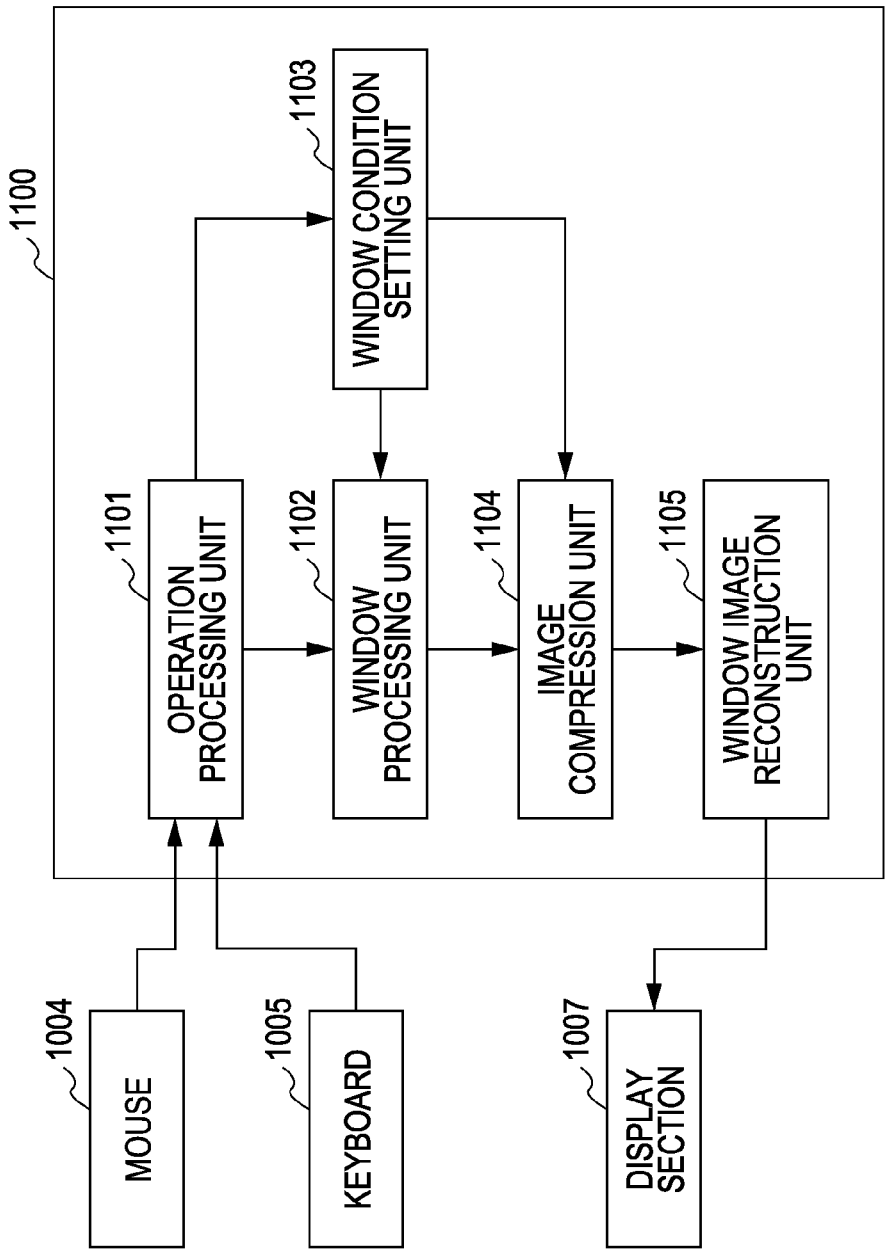
FIG. 16 is a block diagram illustrating a window processing section included in an image display apparatus according to the fifth embodiment of the present invention.

FIG. 16 is a block diagram schematically illustrating a configuration of an image display apparatus according to this embodiment. Referring to FIG. 16, an image display apparatus according to this embodiment includes a window processing section 1100. The window processing section 1100 includes an operation processing unit 1101, a window processing unit 1102, a window condition setting unit 1103, an image compression unit 1104, and a window image reconstruction unit 1105. The operation processing unit 1101 receives input information from the mouse 1004 or the keyboard 1005, and performs operation processing in accordance with the input information. Examples of the operation processing include window operation processing such as opening, closing, movement, or resizing of a window, and non-window operation processing such as text input or cursor control performed for application software operated in a window.

If the window operation processing is performed, the window processing unit 1102 performs window processing in accordance with input information.

Figure 17A:
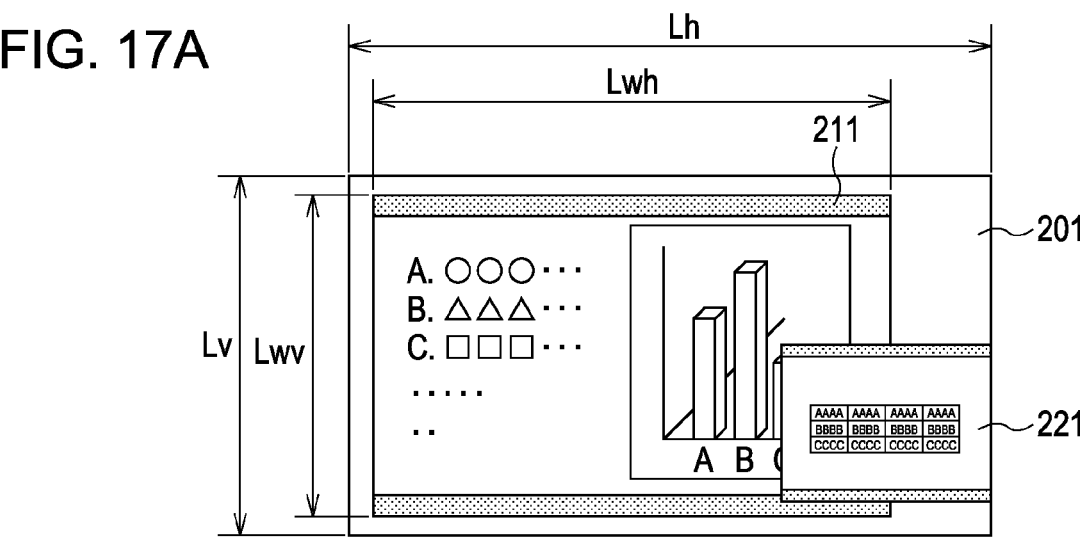
FIGS. 17A, 17B, and 17C are diagrams illustrating display examples of a screen according to the fifth embodiment of the present invention when the screen is moved to the left.
Figure 17B:
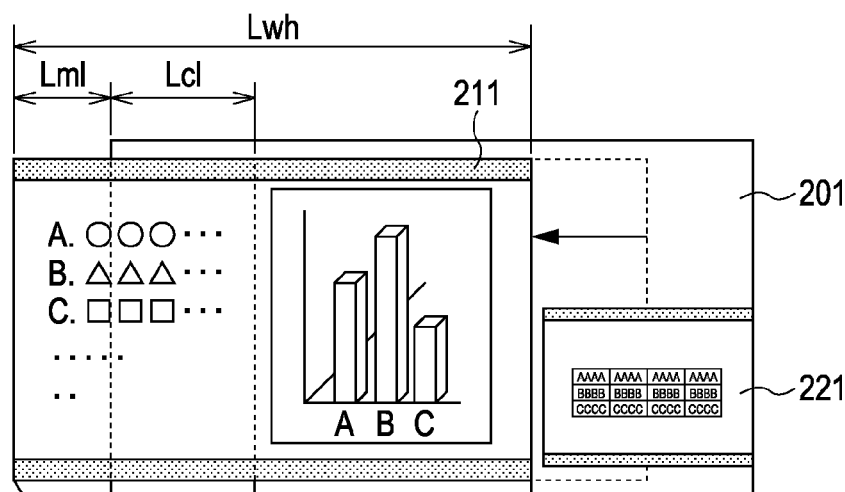
Figure 17C:
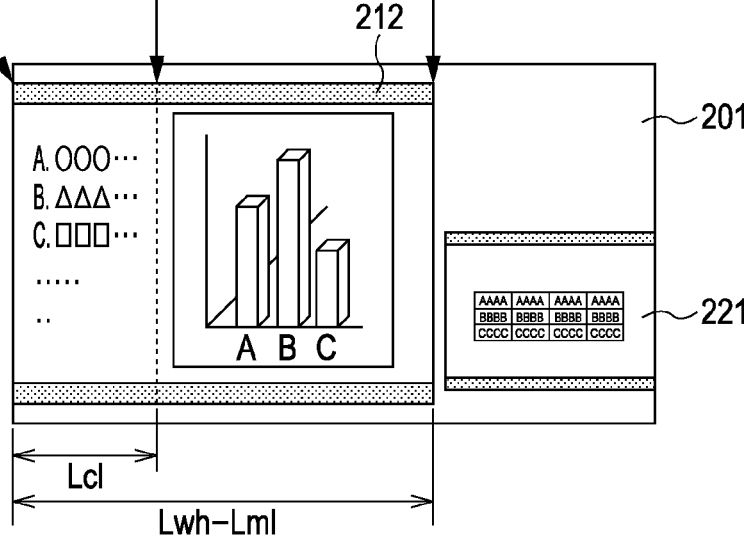

FIGS. 17A, 17B, and 17C are diagrams illustrating display examples when a screen according to the fifth embodiment of the present invention is moved to the left. Referring to FIG. 17A, on a screen 201 included in the display section 1007, a window 221 is displayed in front of a window 211. An example in which the window 211 is moved to the left so as not to overlap with the window 221 will be described. At that time, the window processing unit 1102 moves the window 211 to the left and monitors whether the moved window 211 is in the display area of the screen 201. The amount of movement of the window may be determined by a user's operation, or may be set in advance. If the amount of movement is large and the moved window extends off the display area of the screen 201 as illustrated in FIG. 17B, the window processing unit 1102 detects an area extending off the screen 201.

On the other hand, the window condition setting unit 1103 sets a compressed image display area so as to compress an image extending off the screen 201 and display the compressed image. The compressed image display area is set using a fixed ratio for each of the number of pixels Lh in the horizontal direction on the screen 201 and the number of pixels Lv in the vertical direction on the screen 201. This ratio will be hereinafter referred to as a compressed image display area setting value. It is assumed that a compressed image display area setting value for a compressed image display area at the left or right end is Hcp, a compressed image display area setting value for a compressed image display area at the upper or lower end is Vcp, a compressed image display area at the left or right end is Lch, and a compressed image display area at the upper or lower end is Lcv. Compressed image display areas Lch and Lcv are determined as follows.

$$Lch = Lh \times Hcp/100$$

$$Lcv = Lv \times Vcp/100$$

The compressed image display area setting value Hcp for a compressed image display area at the left end may be different from the compressed image display area setting value Hcp for a compressed image display area at the right end. The compressed image display area setting value Vcp for a compressed image display area at the upper end may be different from the compressed image display area setting value Vcp for a compressed image display area at the lower end.

A compressed image display area may not be set using a ratio for the number of pixels Lh in the horizontal direction on the screen 201 or the number of pixels Lv in the vertical direction on the screen 201, and may be directly set using the number of pixels in the horizontal direction or the number of vertical lines on the screen 201.

Alternatively, a compressed image display area may be set using a ratio for a window 212 that is displayed on the screen 201 without extending off the screen 201 after the window 211 has been moved. For example, as illustrated in FIG. 17B, if the window 211 is moved to the left and a part of the window 211 in an area from the left end thereof to a position apart from the left end by the distance Lml extends off the screen 201, the number of pixels in the horizontal direction in a remaining part of the window 211 displayed on the screen 201 is represented by (Lwh−Lml). At that time, assuming that a compressed image display area setting ratio is Hwcp and a compressed image display area at the left end of the screen 201 is Lcl, the compressed image display area Lcl is determined by the following equation.

$$Lcl=(Lwh-Lml) \times Hwcp/100$$

An example in which a window is moved to the left has been described. However, the above-described method can also be applied to cases in which a window is moved to the right, and a window is upwardly and downwardly moved.

Furthermore, a compressed image display area may be set in such a manner that an object displayed in a non-compressed image display area of the window 212, which is a window displayed in the display area of the screen 201 after the window 211 has been moved, is identified, and then the compressed image display area is determined so as not to include the object or so as to give priority to display of the object.

The above-described setting for the window condition setting unit 1103 can be performed using a menu screen displayed as a user interface via the operation processing unit 1101.

In FIG. 17B, if the window processing unit 1102 detects the area extending off the display area of the screen 201, the image compression unit 1104 generates the window 212. More specifically, the image compression unit 1104 reduces, based on the setting of the window condition setting unit 1103, an area Lml of the window 211 extending off the display area of the screen 201 and the compressed image display area Lcl so that these areas fit within the compressed image display area Lcl illustrated in FIG. 17C. Subsequently, the window image reconstruction unit 1105 reconstructs the moved window image using a compressed image generated by the image compression unit 1104 and an image outside the compressed image display area, and displays the reconstructed image in the display section.

Examples of an image compression method include the following methods: a method of linearly compressing an area Lml extending off the screen 201 and a compressed image display area Lcl using, for example, a compression ratio of Lcl/(Lcl+Lml); a method of nonlinearly compressing these areas by changing a compression ratio so that a higher compression ratio is obtained on the side of one end of the compressed image display area; a method of detecting a blank image (for example, a black or white image) included in a part of the window 211 in the area from the left end thereof to the position apart from the left end by the distance (Lcl+Lml), and setting a high compression ratio for an area including the detected blank image or removing the blank image and compressing only the remaining part excluding the blank image for display; and a method of identifying objects displayed in the window 211, determining whether the moved window 211 extends off the display area of the screen 201, sequentially compressing spaces between the objects from one end of the display screen in the entire area of the window when it is determined that the moved window 211 extends off the display area of the screen 201, and performing any one of the above-described image compression methods when the moved window 211 still extends off the display area of the screen 201 despite the above-described processing.

Figure 18:
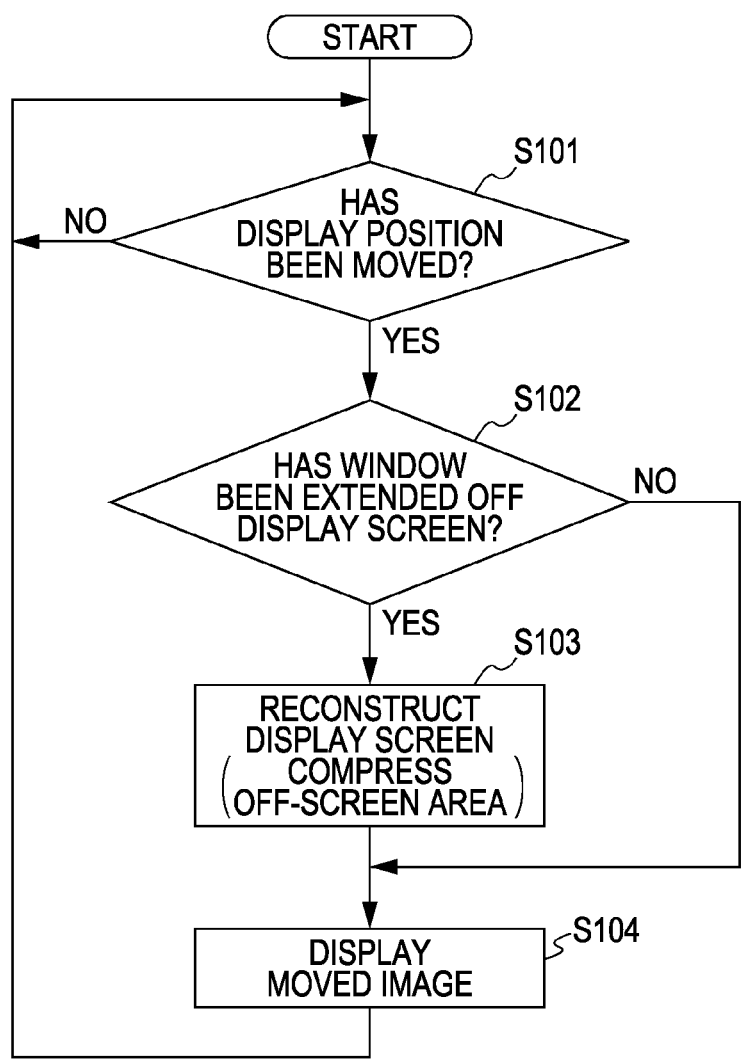
FIG. 18 is a flowchart describing a window process according to the fifth embodiment of the present invention.

Next, a process performed by the window processing section 1100 will be described with reference to a flowchart illustrated in FIG. 18. First, in step S101, the window processing unit 1102 determines whether a window has been moved. If the window has not been moved, the window processing unit 1102 continues to monitor movement of the window. If the window has been moved, in step S102, the window processing unit 1102 determines whether the moved window extends off the display area of the screen 201.

If the moved window does not extend off the display area of the screen 201, in step S104, the window image reconstruction unit 1105 displays the moved window. If the moved window extends off the display area of the screen 201, the image compression unit 1104 compresses a part of the window extending off the screen 201 and a part of the window in a compressed image display area so that these parts fit within the compressed image display area so as to generate a compressed image in step S103, and displays a moved window using the compressed image in step S104.

Thus, even if a window is moved and the moved window extends off a display screen, all the information contained within the window can be displayed without loss of the information.

Sixth Embodiment

Figure 19A:
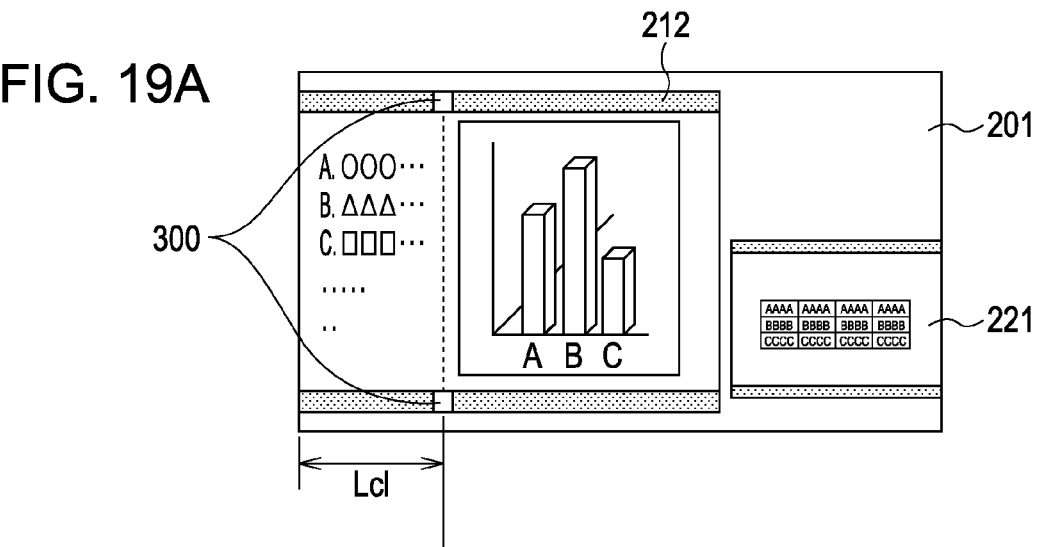
FIGS. 19A and 19B are diagrams illustrating display examples of a screen according to a sixth embodiment of the present invention.
Figure 19B:
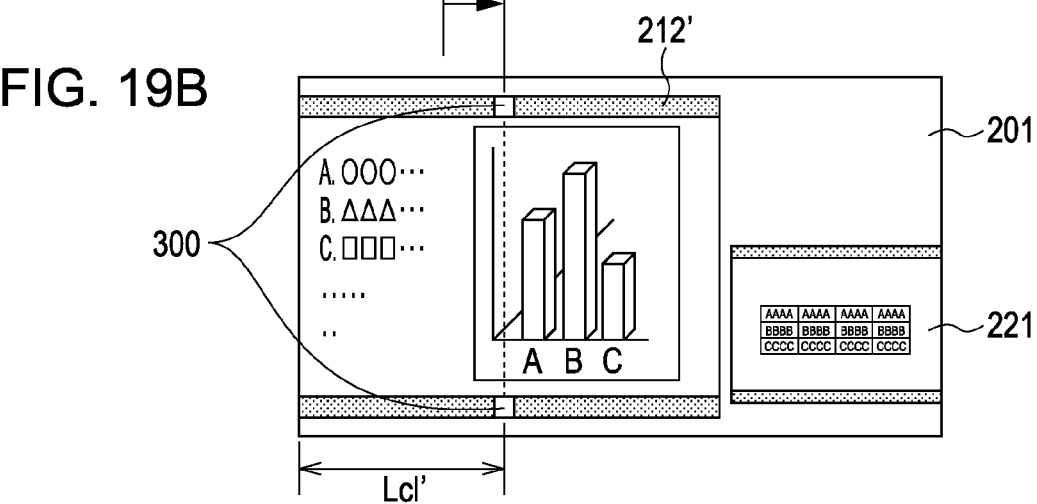

In this embodiment, as illustrated in FIGS. 19A and 19B, a border between a compressed image display area and a normal display area is visible using a slider 300.

The hardware configuration of a multi-window system of an image display apparatus according to this embodiment and the schematic configuration of the image display apparatus are the same as those according to the fifth embodiment illustrated in FIGS. 15 and 16.

In FIGS. 19A and 19B, a user operates the slider 300 using the mouse 1004 so as to change the compressed image display area Lcl, so that a window 212' including a compressed image display area Lcl' is displayed as illustrated in FIG. 19B.

Figure 20A:
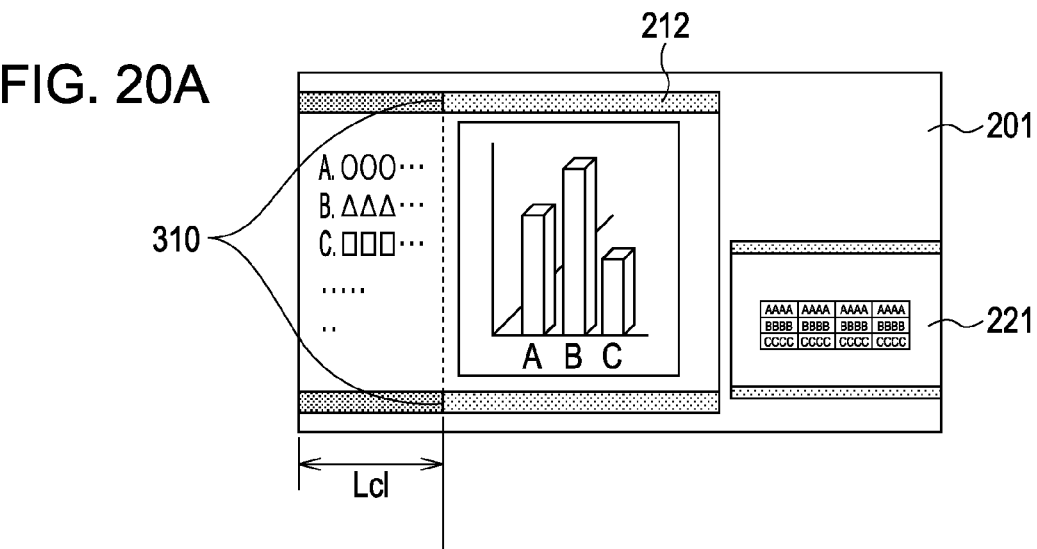
FIGS. 20A and 20B are diagrams illustrating display examples of a screen according to the sixth embodiment of the present invention.
Figure 20B:
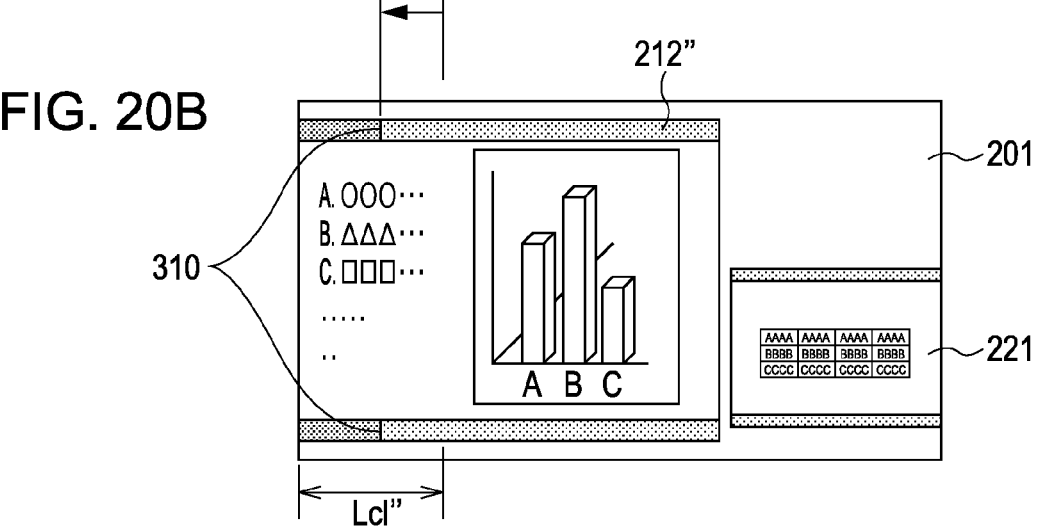

Instead of the slider 300, another method capable of denoting the border between the compressed image display area and the normal display area and changing the compressed image display area may be used. Accordingly, as illustrated in FIG. 20, a method of displaying a window frame using different colors may be used.

Figure 21:
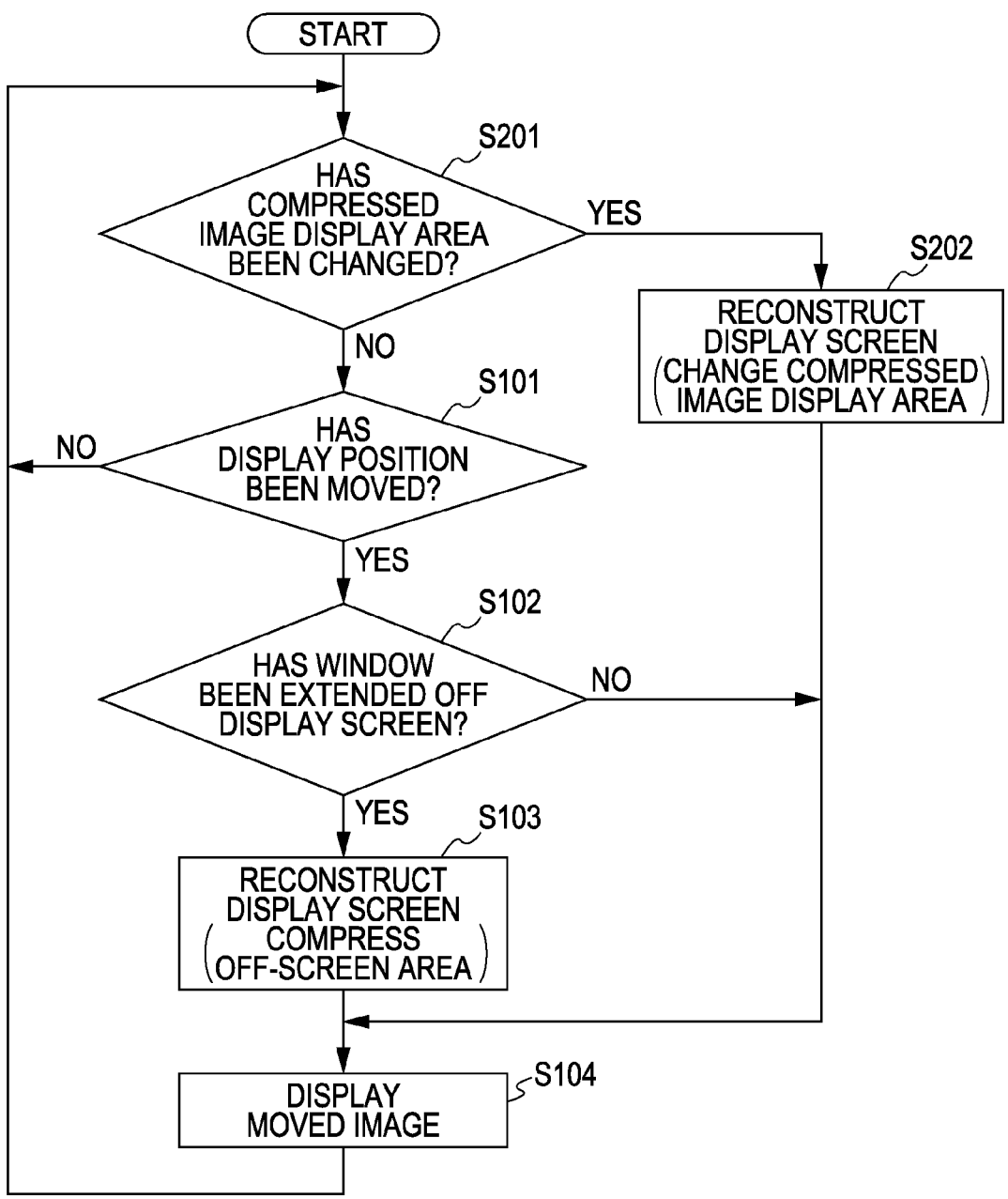
FIG. 21 is a flowchart describing a window process according to the sixth embodiment of the present invention.

Next, a process performed by the window processing section 1100 according to this embodiment will be described with reference to a flowchart illustrated in FIG. 21.

First, in step S201, the window processing unit 1102 monitors whether a compressed image display area in a window has been changed. If there is no change in the compressed image display area, the process proceeds to step S101 in which the window processing unit 1102 determines whether the window has been moved. If the window has not been moved, the process returns to step S201 in which the window processing unit 1102 continues to monitor change in the compressed image display area and movement of the window. If it is determined in step S101 that the window has been moved, the process from step S102 to step S104 is performed. The process from step S102 to step S104 is the same as that according to the fifth embodiment, and the description thereof will be omitted.

If it is determined in step S201 that the compressed image display area has been changed, the window image reconstruction unit 1105 reconstructs a window image in step S202 based on the change in the compressed image display area, and displays the reconstructed window image in step S104.

As described previously, the compressed image display area can always be changed as appropriate based on information displayed in a window.

Another Embodiment

A program stored in an RAM or a ROM included in a computer is executed, whereby each section included in an image display apparatus according to an embodiment of the present invention and each step of an image display method can be achieved. This program and the above-described computer readable recording medium recording the program are included in the present invention.

For example, the present invention can be practiced in the forms of a system, an apparatus, a method, a program, a recording medium, etc. More specifically, the present invention may be applied to a system including a plurality of devices or an apparatus formed by a single device.

The present invention may be achieved as follows. A software program achieving the functions of the above-described embodiments is directly or remotely provided for a system or an apparatus. The program code is read out and executed by a computer for the system or apparatus, whereby the present invention can be achieved.

Accordingly, the present invention can also be achieved by the program code that is installed on a computer so as to cause the computer to achieve the functional processing of the present invention. That is, a computer program for achieving the functional processing of the present invention is included in the present invention.

Instead of the computer program, other forms such as an object code, a program executed by an interpreter, and script data provided for an OS may be used as long as they have the function of the program.

As a recording medium for providing a program, for example, a flexible disk, a hard disk, an optical disc, a magneto-optical disk, an MO, a CD-ROM, a CD-R, a CD-RW, a magnetic tape, a nonvolatile memory card, a ROM, and a DVD (DVD-ROM or DVD-R) may be used.

A program may be provided by connecting a client computer to an Internet home page via the browser of the client computer, and downloading a computer program according to an embodiment of the present invention from the home page. Alternatively, a compressed file that has an automatic installation function may be downloaded to a recording medium such as a hard disk.

In addition, a program according to an embodiment of the present invention may be provided in such a manner that a program code configuring the program is divided into a plurality of files, and the divided files are individually downloaded from different home pages. That is, a WWW server that allows a plurality of users to download program files required for causing a computer to perform functional processing of the present invention is included in the present invention.

A program according to an embodiment of the present invention may be encrypted, be stored on a recording medium such as a CD-ROM, and then be provided to a user. If the user satisfies predetermined conditions, the user is allowed to download decryption key information from a home page via the Internet. The user can execute the encrypted program using the downloaded decryption key information, and then install the program on a computer.

When the computer executes the program, the functions of the above-described embodiments can be achieved. Furthermore, an OS or the like running on the computer may perform a part of or all of the processing in accordance with the instruction of the program, whereby the functions of the above-described embodiments can be achieved.

Still furthermore, the program read out from the recording medium may be written in a function expansion board inserted into a computer or in a memory provided for a function expansion unit connected to a computer. Subsequently, a CPU included in the function expansion board or the function expansion unit performs a part of or all of the processing in accordance with the instruction of the program, whereby the functions of the above-described embodiments can be achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. An image processing apparatus comprising:
   a non-transitory computer-readable medium storing a computer executable program;
   a processor to execute a method based on the computer executable program, the method comprising:
   moving a display position of an image displayed on a display screen;
   setting a compressed image display area and a non-compressed image display area in the image, the compressed image display area and the non-compressed image display area being serially arranged in a moving direction of the image, and the compressed image display area being arranged at a front end in the moving direction of the image;
   determining a reduction amount of a length of the image to be displayed on the screen in the moving direction by moving the display position of the image; and
   compressing an image of the compressed image display area corresponding to the determined reduction amount of the length of the image.

2. The image processing apparatus according to claim 1, wherein, in a case where a length of the compressed image display area in the moving direction of the image is Lc and a length of the non-compressed image display area in the moving direction of the image is Lm, and in a case where Lm≥Lc, an image of the compressed image display area is compressed at a compression ratio of Lc/(Lc+Lm).

3. The image processing apparatus according to claim 1, wherein, in a case where a length of the compressed image display area in the moving direction of the image is Lc and a length of the non-compressed image display area in the moving direction of the image is Lm, and in a case where Lm<Lc, an image to be displayed in the compressed image display area is compressed at a compression ratio of (Lc−Lm)/Lc.

4. The image processing apparatus according to claim 1, wherein the method further comprises displaying a border between the compressed image display area and another area.

5. The image processing apparatus according to claim 4, wherein the border is displayed by a slider, and the compressed image display area is changeable by operating the slider.

6. The image processing apparatus according to claim 4, wherein the border is displayed by changing color of a frame of a window on which the image is displayed.

7. A method comprising:
   moving a display position of an image displayed on a display screen;
   setting a compressed image display area and a non-compressed image display area in the image, the compressed image display area and the non-compressed image display area being serially arranged in a moving direction of the image, and the compressed image display area being arranged at a front end in the moving direction of the image;

determining a reduction amount of a length of the image to be displayed on the screen in the moving direction by moving the display position of the image; and compressing an image of the compressed image display area corresponding to the determined reduction amount of the length of the image.

8. A non-transitory computer-readable medium storing a computer executable program for causing a computer to execute a method comprising:

moving a display position of an image displayed on a display screen;

setting a compressed image display area and a non-compressed image display area in the image, the compressed image display area and the non-compressed image display area being serially arranged in a moving direction of the image, and the compressed image display area being arranged at a front end in the moving direction of the image;

determining a reduction amount of a length of the image to be displayed on the screen in the moving direction by moving the display position of the image; and compressing an image of the compressed image display area corresponding to the determined reduction amount of the length of the image.

* * * * *